Dec. 11, 1928.

Re. 17,156

W. H. BASSETT

HOLLOW CONDUCTOR

Original Filed Oct. 3, 1924

INVENTOR

WILLIAM H. BASSETT.

BY

Anthony Ulrich, ATTORNEY

Reissued Dec. 11, 1928. Re. 17,156

UNITED STATES PATENT OFFICE.

WILLIAM H. BASSETT, OF CHESHIRE, CONNECTICUT, ASSIGNOR TO THE AMERICAN BRASS COMPANY, OF WATERBURY, CONNECTICUT, A CORPORATION OF CONNECTICUT.

HOLLOW CONDUCTOR.

REISSUED

Original No. 1,597,422, dated August 24, 1926, Serial No. 741,343, filed October 3, 1924. Application for reissue filed May 17, 1927. Serial No. 192,124.

My invention relates to hollow conductors which are of relatively large diameter for a given cross-sectional area of the conducting material so as to permit them to be used for high voltage transmission without substantial corona loss or for other purposes requiring maximum diameter and surface with reduced cross-section of conducting material, and has for its object to produce a new and improved hollow conductor of the required flexibility, high resistance to mechanical injury liable to result from crushing stresses, high tensile strength, maximum conducting efficiency, and relatively low weight. My improved conductor may be used bare or insulated as occasion requires.

Conductors heretofore made have been open to various objections. Thus, solid conductors when used for high voltage transmission are of such small diameter that the corona losses are so great as to render the transmission relatively inefficient, a disadvantage which numerous inventors have attempted to overcome by making the conductors hollow and thus increasing the diameter of the conductors relatively to the cross-sectional area of the conducting material.

It has been proposed to make such hollow conductors in various ways, all which, however, have been found subject to certain disadvantages, which it is the purpose of my present invention to obviate.

A cable embodying my invention is shown in the accompanying drawings, in which:—

Figure 1:
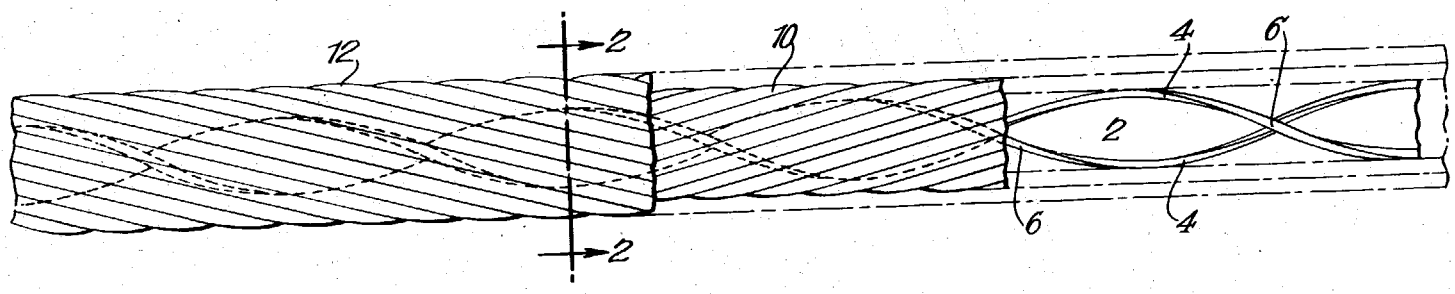
Fig. 1 shows a portion of a cable partly in side elevation and partly broken away.
Figure 4:
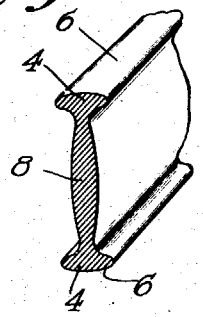
Fig. 4 shows, on an enlarged scale, a modified form of strip.
Figure 3:
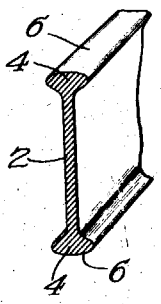
Fig. 3 shows a portion of the strip on an enlarged scale.

Referring more particularly to the drawings, 2 represents a twisted strip having at its edges laterally projecting portions or flanges forming thickened edges or heads 4—4 so as to make it substantially I-shaped in cross-section. The outer surfaces 6—6 of these heads are curved so as to substantially conform to the inner surfaces of wires or strands cabled thereon. The central part 8 of the body portion of the strip may be thickened so as to give the strip greater tensile strength as shown in Fig. 4. The twisted strip is twisted about its longitudinal axis, the preferable pitch being about one complete twist to four inches for a strip five-eighths of an inch in width. A strip of such width whose body portion is .040 of an inch thick and whose edges are .090 of an inch thick gives satisfactory results.

About the twisted strip, wires or strands 10 are cabled and if desired another layer of wires or strands 12, thus making up the completed cable as shown. As shown in the drawings the wires or strands are round but obviously that form of wire or strand is not necessary to the embodiment of the invention.

In forming the cable the strip in untwisted form with its projecting flanges is first produced. It is then twisted as shown and then fed to a cabling machine where it is surrounded with one or more layers of conducting wires or strands thus producing the complete cable.

The thickened edges of the core are of especial importance in connection with the manufacture of the cable. Where a flat strip is used, the strip being twisted often suddenly changes from a spiral twist to a helical twist or curl which would continue for a foot or more before it could be stopped. In some cases in working with the flat strip this has happened so often as to spoil the entire lot even for experimental purposes. A single spot where the twist has changed from a spiral form to a helical form ruins the core for commercial purposes. When the strip has the flanges described herein this difficulty is eliminated, and cores many miles in length can be made without defects in the twist.

Figure 2:
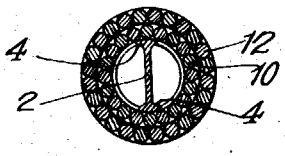
Fig. 2 shows a transverse section of the same on the line 2—2 of Fig. 1.

The use of two, and maybe more, layers of conducting wires or strands and of different sizes as in Fig. 2 has a special value in the production and in the use of the hollow style of cable. It is desirable to keep the external diameter of the cable small on account of sleet and wind loads. The cross-section is fixed by the requisite current-carrying capacity. There is a minimum limit to the size of the wires, below which they are small and delicate and comparatively expensive. But by making the conductor in two layers, the flexibility of the cable is improved; and by using wires of different sizes in the two layers the combination of determined current-carrying capacity (or metal cross-section) and small outside diameter can be more closely approximated under the conditions of operation of conductor-laying machines.

It is also important to have a comparatively wide bearing of the inner conducting wires on the core. A better cable to meet all these required conditions can be designed by using a plurality of layers, each layer made of strands which in turn consist of several wires and the wires or strands in the cable being spiralled in the same direction or in different directions.

The flanges on the twisted strip constitute in effect a hollow spiral with a comparatively wide bearing face for the strands, the body portion constituting a comparatively narrow support extending across the interior of the hollow spiral; and the invention includes various other constructions than that specifically illustrated embodying this combination of hollow core and internal support.

Various other means than the flanges described may be used for stiffening the strip against longitudinal bending and for thus opposing its changing from the desired spiral twist to a helical twist.

The strands or wires are of copper or bronze or similar metal of high conductivity such as is commonly used for conducting cables, and the core is preferably of the same metal. The action of the edges of the core is therefore more important than would be the case in cables made of steel or similar hard metal.

Various other modifications than those described and suggested above may be made by those skilled in the art without departing from the invention as defined in the following claims.

What I claim is:

1. In a conducting cable comprising a series of strands cabled so as to form a tube, a core formed by a twisted strip having thickened conducting portions forming spiral surfaces engaged by said strands and supporting the same.

2. In a conducting cable comprising a series of strands cabled so as to form a tube, a core formed by a twisted strip having a body portion and projecting flanges forming thickened edges thereon, said flanges providing thickened conducting portions and spiral surfaces engaged by said strands and supporting the same.

3. In a conducting cable comprising a series of strands cabled so as to form a tube, a core formed of a twisted strip having a thin body portion and projecting flanges upon its edges so as to have an I-shaped cross-section, said flanges providing thickened conducting portions and spiral surfaces supporting said strands.

4. In a conducting cable comprising a series of strands cabled so as to form a tube, a core formed by a twisted strip having a body portion and projecting flanges forming thickened edges thereon, said flanges providing thickened conducting portions and spiral surfaces engaged by said strands and supporting the same, said spiral surfaces being curved transversely so as to substantially conform to the inner surface of the tube.

5. In a conducting cable comprising a series of strands cabled so as to form a tube, a core formed by a twisted strip having a body portion and projecting flanges forming thickened edges thereon, said flanges providing thickened conducting portions and spiral surfaces engaged by said strands and supporting the same, said thickened conducting portions being about twice as thick as the adjacent body portion.

6. A conducting cable comprising a series of strands cabled so as to form a tube and a core including a twisted strip and means for stiffening said strip against longitudinal bending.

7. In a conducting cable comprising a series of strands cabled so as to form a tube, a core formed by a twisted strip having a body portion and projecting flanges, said flanges forming a comparatively wide-faced spiral bearing for the cabled strands and said body portion forming a comparatively narrow transverse support.

8. A flexible conductor for high voltage transmission which is hollow so as to have a comparatively large external surface with reduced metallic cross section, said conductor comprising strands cabled so as to form a tube, comparatively wide-faced spiral bearing means for the internal surface of said tube of cabled strands and comparatively narrow supporting means extending diametrically across the space between opposite portions of said bearing means.

9. A flexible conductor for high voltage transmission which is hollow so as to have a comparatively large external surface with reduced metallic cross section, said conductor comprising strands cabled so as to form a tube and arranged in a plurality of layers, the strands of the respective layers being of different sizes and being of metal of the same high conductivity, comparatively wide-faced spiral bearing means for the internal surface of said tube of cabled strands and comparatively narrow supporting means extending diametrically across the space between opposite portions of said bearing means.

In witness whereof, I have hereunto signed my name.

WILLIAM H. BASSETT.